(12) United States Patent
Favalli et al.

(10) Patent No.: US 12,128,727 B2
(45) Date of Patent: Oct. 29, 2024

(54) METHOD TO CONTROL THE ACTIVE SHOCK ABSORBERS OF A ROAD VEHICLE FEATURING THE ADJUSTMENT OF THE ROLL ANGLE AND OF THE PITCH ANGLE

(71) Applicant: FERRARI S.p.A., Modena (IT)

(72) Inventors: Federico Favalli, Modena (IT); Francesca Mincigrucci, Modena (IT)

(73) Assignee: FERRARI S.P.A., Modena (IT)

( * ) Notice: Subject to any disclaimer, the term of this patent is extended or adjusted under 35 U.S.C. 154(b) by 103 days.

(21) Appl. No.: 17/830,570

(22) Filed: Jun. 2, 2022

(65) Prior Publication Data

US 2022/0396111 A1 Dec. 15, 2022

(30) Foreign Application Priority Data

Jun. 10, 2021 (IT) .......................... 102021000015182

(51) Int. Cl.
*B60G 17/018* (2006.01)
*B60G 17/019* (2006.01)

(52) U.S. Cl.
CPC ..... *B60G 17/018* (2013.01); *B60G 17/01908* (2013.01); *B60G 2400/0511* (2013.01);
(Continued)

(58) Field of Classification Search
CPC ............ B60G 17/018; B60G 17/01908; B60G 2400/0511; B60G 2400/0512; B60G 2400/104; B60G 2400/106; B60G 2202/416; B60G 2401/16; B60G 2401/28; B60G 2500/02; B60G 2500/30; B60G 2600/02; B60G 2600/182; B60G 2800/214; B60G 2800/22; B60G 2800/248; B60G 2800/9123; B60G 2800/914;
(Continued)

(56) References Cited

U.S. PATENT DOCUMENTS 5,515,277 A    5/1996  Mine
7,275,750 B2  10/2007  Suchta et al.
(Continued)

FOREIGN PATENT DOCUMENTS

DE    102005053222 A1    5/2007
DE    102020000441 A1    9/2020
(Continued)

OTHER PUBLICATIONS

Machine Translation of JP 2011093425 A PDF File Name: "JP2011093425A_Machine_Translation.pdf".*
(Continued)

*Primary Examiner* — Grant Moubry
*Assistant Examiner* — Ruben Picon-Feliciano
(74) *Attorney, Agent, or Firm* — CANTOR COLBURN LLP

(57) ABSTRACT

Method to control active shock absorbers of a road vehicle. Each active shock absorber is part of a suspension connecting a frame to a hub of a wheel and is provided with an actuator. The control method comprises the steps of: determining a longitudinal acceleration and a transverse acceleration of the road vehicle; establishing a desired roll angle based on the transverse acceleration; and establishing a desired pitch angle based on the longitudinal acceleration.

29 Claims, 7 Drawing Sheets

(52) U.S. Cl.
CPC ............ *B60G 2400/0512* (2013.01); *B60G 2400/104* (2013.01); *B60G 2400/106* (2013.01)

(58) Field of Classification Search
CPC .......... B60G 2800/915; B60G 17/0162; B60G 17/0164; B60G 17/08; B60G 17/0157; B60G 17/015; B60G 2800/164; B60G 2800/24

See application file for complete search history.

(56) References Cited

U.S. PATENT DOCUMENTS

| | | |
|---|---|---|
| 2009/0037051 A1 | 2/2009 | Shimizu et al. |
| 2012/0078470 A1 | 3/2012 | Hirao et al. |
| 2013/0190980 A1* | 7/2013 | Ramirez Ruiz .... B60G 17/0162 701/38 |
| 2017/0240017 A1 | 8/2017 | Vandersmissen et al. |
| 2019/0047348 A1 | 2/2019 | Mihailescu et al. |

FOREIGN PATENT DOCUMENTS

| | | | |
|---|---|---|---|
| EP | 3699065 A1 | | 8/2020 |
| JP | 2011093425 A | * | 5/2011 |
| WO | 2014145215 A2 | | 9/2014 |

OTHER PUBLICATIONS

"Announcement", ATZ, Springer Vieweg, DE, vol. 96, No. 12, Dec. 1, 2994, pp. 734-736, 743, XP000486412.

Search Report for Italian Application No. 102021000015182, completed Feb. 7, 2022, 11 pages.

EP Search Report from EP Application No. 22177374.0-1009, dated Oct. 17, 2022, 11 pages.

Office Action for European Patent App. No. 22177374.0, Date of Mailing: Aug. 16, 2024, 7 pages.

* cited by examiner

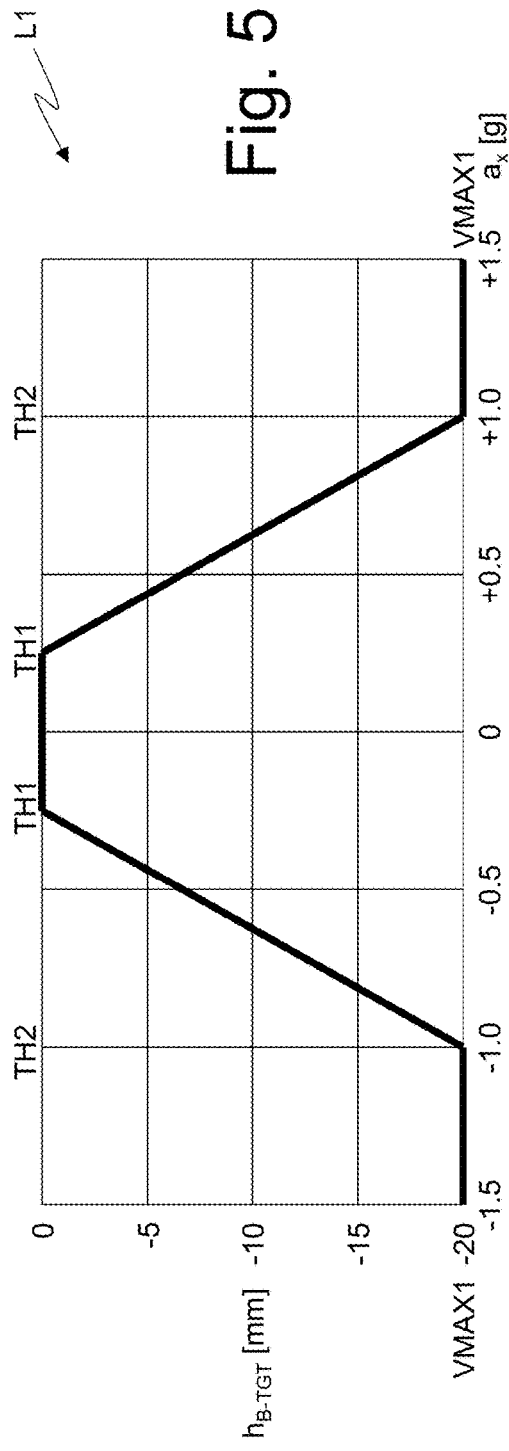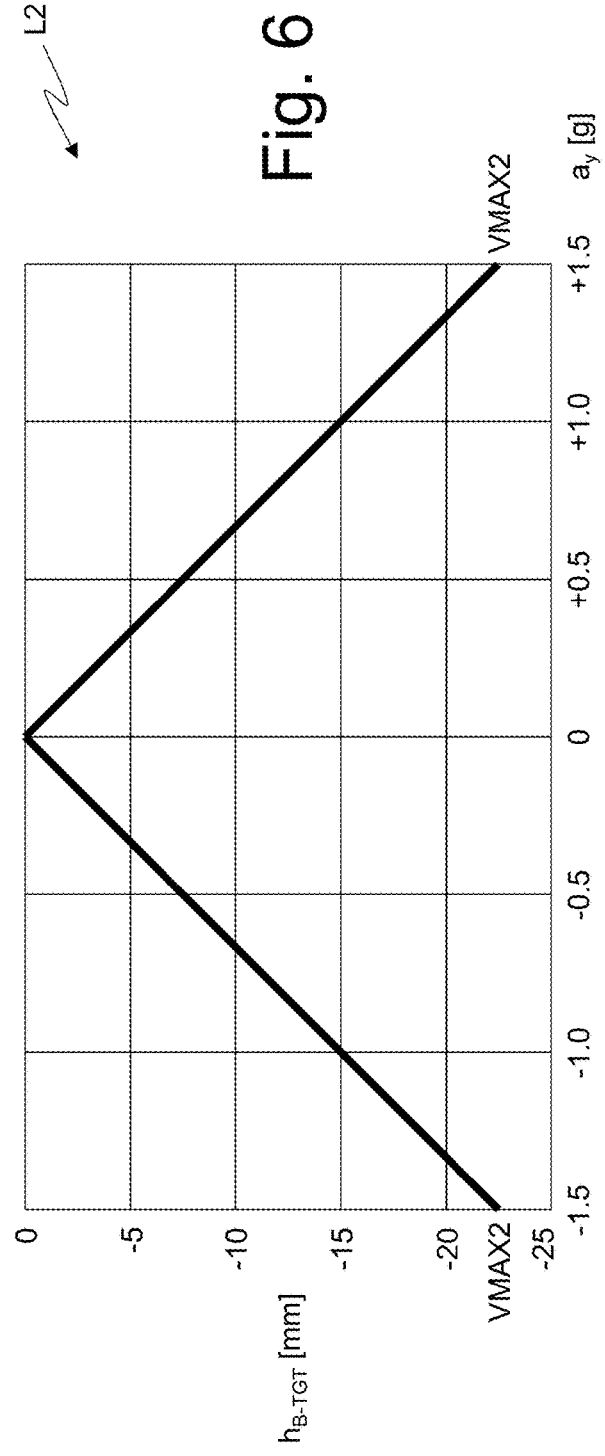

METHOD TO CONTROL THE ACTIVE SHOCK ABSORBERS OF A ROAD VEHICLE FEATURING THE ADJUSTMENT OF THE ROLL ANGLE AND OF THE PITCH ANGLE

CROSS-REFERENCE TO RELATED APPLICATIONS

This patent application claims priority from Italian patent application no. 102021000015182 filed on Jun. 10, 2021, the entire disclosure of which is incorporated herein by reference.

TECHNICAL FIELD

The invention relates to a method to control the active shock absorbers of a road vehicle.

BACKGROUND ART

The movement of passive shock absorbers is entirely determined by the stresses transmitted by the road surface and, therefore, passive shock absorbers are "at the mercy" of the road surface. For a few years now, active shock absorbers have been offered, which are capable of making autonomous movements (namely, completely independent of the stresses transmitted by the road surface), which are added to the movements caused by the stresses transmitted by the road surface; the aim of the autonomous movements made by an active shock absorber is that of reacting to the stresses transmitted by the road surface so as to maximize the dynamic performance of the road vehicle or improve the driving comfort of the road vehicle (the same road vehicle can have its active shock absorbers pursue different targets depending on the type of driving chosen by the driver).

An active shock absorber is provided with an electric or hydraulic actuator of its own, which can be controlled so as to generate an autonomous movement (namely, completely independent of the stresses transmitted by the road surface); for example, by controlling the actuator of an active shock absorber, the frame of the road vehicle can be lowered or lifted in an independent manner on each wheel (even when the vehicle is still).

Patent application US2009037051A1 describes a method to control the attitude of a vehicle provided with active suspensions comprising respective actuators producing a force; a control unit adjusts an attitude change by controlling the force produced by each actuator. The control unit sets up a longitudinal virtual control line and a transverse virtual control line, which are changed so as to pursue the target pitch and roll and, hence, controls the attitude of the vehicle so that the attitude of the vehicle is as close as possible to the virtual control lines.

Patent application US2012078470A1 discloses a method to control the attitude of a vehicle, wherein a target pitch rate is calculated in accordance with an actual roll rate and the pitch suppression is performed in priority to a roll suppression.

Patent application DE102020000441A1 describes a method to brake or accelerate a road vehicle for passenger transportation.

DESCRIPTION OF THE INVENTION

The object of the invention is to provide a method to control the active shock absorbers of a road vehicle, which maximizes performances while driving in conditions close to the grip limit.

According to the invention, there is provided a method to control the active shock absorbers of a road vehicle according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein:

FIG. 5 is a diagram showing the variation of a desired lowering of the centre of gravity of the road vehicle of FIG. 1 as longitudinal acceleration changes;

FIG. 6 is a diagram showing the variation of a desired lowering of the centre of gravity of the road vehicle of FIG. 1 as transverse acceleration changes;

PREFERRED EMBODIMENTS OF THE INVENTION

Figure 1:
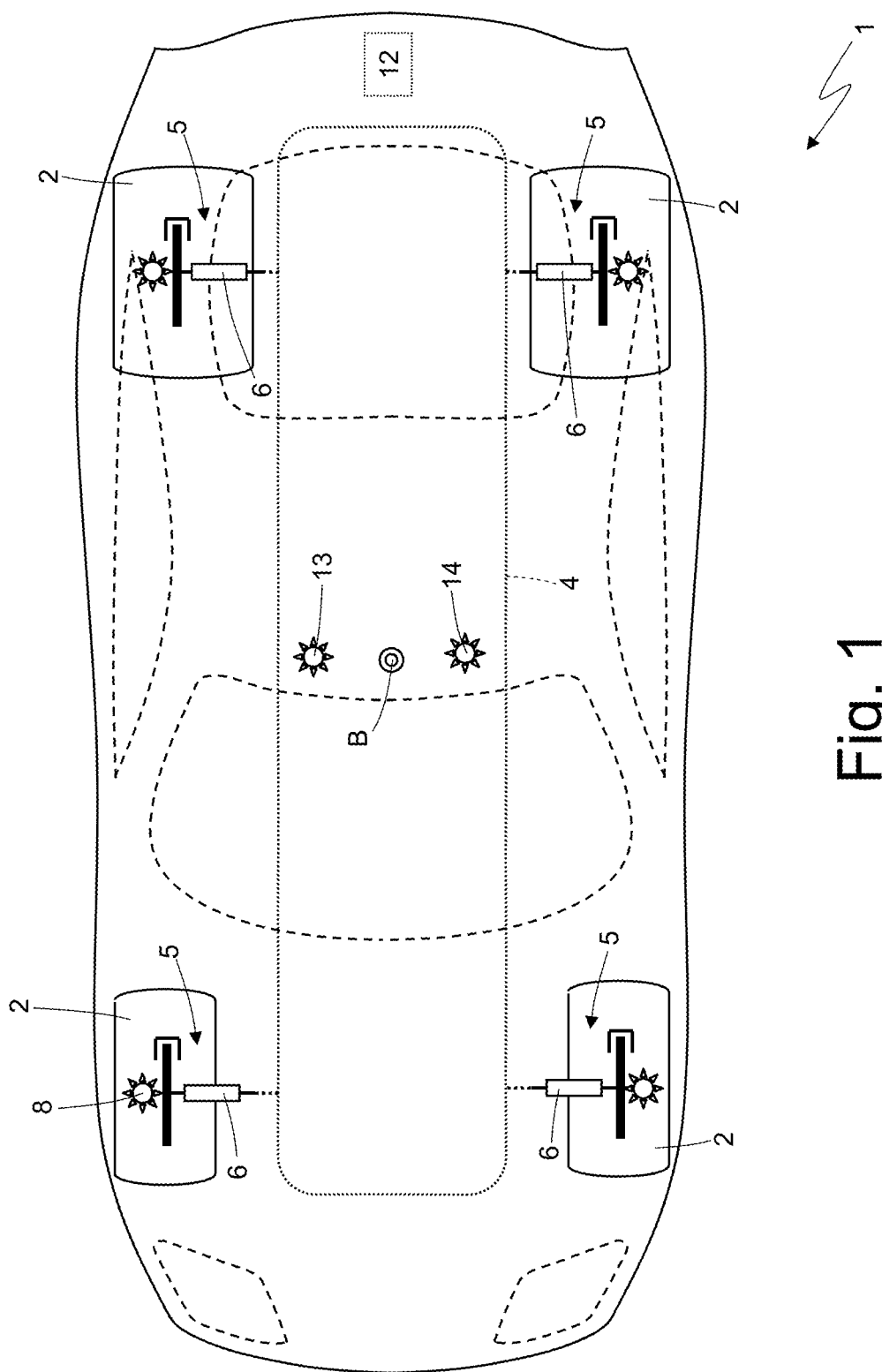
FIG. 1 is a schematic plan view of a road vehicle provided with four active shock absorbers, which are controlled according to the invention.

In FIG. 1, reference number 1 indicates, as a whole, a road vehicle provided with two front wheels 2 and with two rear wheels 2.

The road vehicle 1 is provided with a powertrain system (known and not shown herein), which can comprise an internal combustion engine and/or one or more electric motors.

A hub 3 (schematically shown in FIG. 2) of each wheel 2 is connected to a frame 4 of the road vehicle 1 by means of a suspension 5 (partially shown in FIG. 1), which is provided with an (electronically controlled) active shock absorber 6, which is capable of making autonomous movements (namely, completely independent of the stresses transmitted by the road surface), which are added to the movements caused by the stresses transmitted by the road surface.

Figure 2:
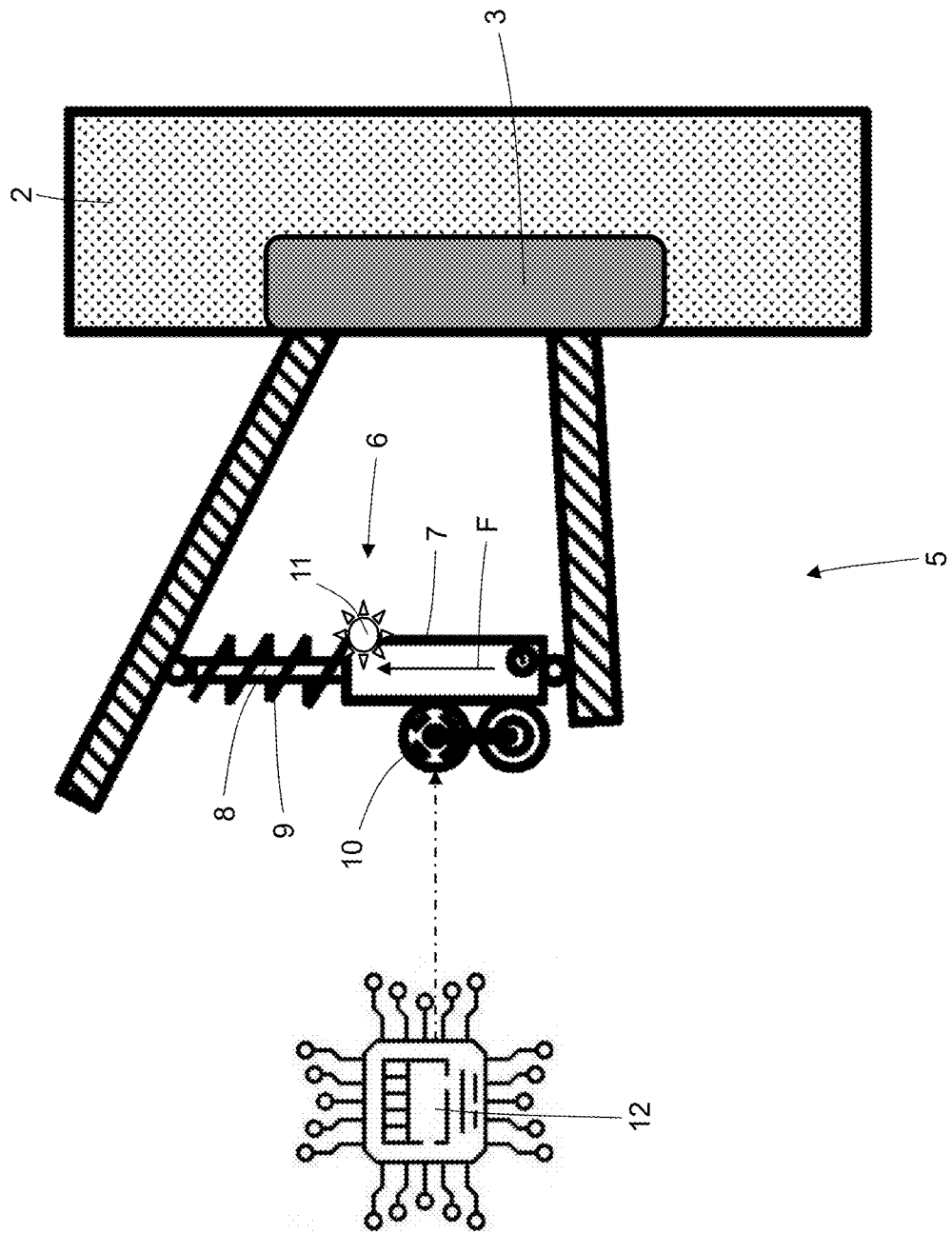
FIG. 2 is a schematic view of a suspension of the road vehicle of FIG. 1.

According to FIG. 2, each active shock absorber 6 comprises an element 7, which defines an end of the active shock absorber 6, and an element 8, which defines the other end of the active shock absorber 6 and is mounted so as to slide relative to the element 7 in order to be able to linearly translate relative to the element 7. Each active shock absorber 6 comprises a spring 9, which is connected between the two elements 7 and 8 and is compressed or expanded when the two elements 7 and 8 linearly translate relative to one another. Finally, each active shock absorber 6 comprises an electric actuator 10, which is configured to have the active shock absorber 6 make autonomous movements (namely, completely independent of the stresses transmitted by the road surface) between the elements 7 and 8, namely is capable of generating a force F, which is applied between the elements 7 and 8. By way of example, the active shock absorbers 6 could be of the type described in patent applications US2008190104A1 and WO2014145215A2. Each active shock absorber 6 comprises a position sensor 11 (for example, a potentiometer), which provides the current relative position $p_{1...4}$ of the two elements 7 and 8, namely the exact measure of how much the element 8 is translated relative to the element 7.

The road vehicle 1 comprises an electronic control unit ("ECU") 12, which, among other things, controls the actuators 10 of the active shock absorbers 6 in the ways described below; from a physical point of view, the control unit 12 can consist of one single device or of several devices, which are separate from one another and communicate through the CAN network of the road vehicle 1.

According to FIG. 1, the road vehicle 1 comprises a longitudinal accelerometer 13 and a transverse accelerometer 14, which are mounted on the frame 4, namely are rigidly fixed to the frame 4 in order to move with the frame in an integral manner 4, and are configured to measure a longitudinal acceleration $a_x$ and a transverse acceleration $a_y$ of the frame 4 (namely, of the road vehicle 1), respectively. According to a possible embodiment, the two accelerometers 13 and 14 could be integrated in one single sensor (for example, a triple-axis accelerometer), which provides both the longitudinal acceleration $a_x$ and the transverse acceleration $a_y$. The control unit 12 is connected (directly or indirectly through a BUS network of the road vehicle 1) to the accelerometers 13 and 14 in order to cyclically read the current values of the longitudinal acceleration $a_x$ and of the transverse acceleration $a_y$.

Figure 3:
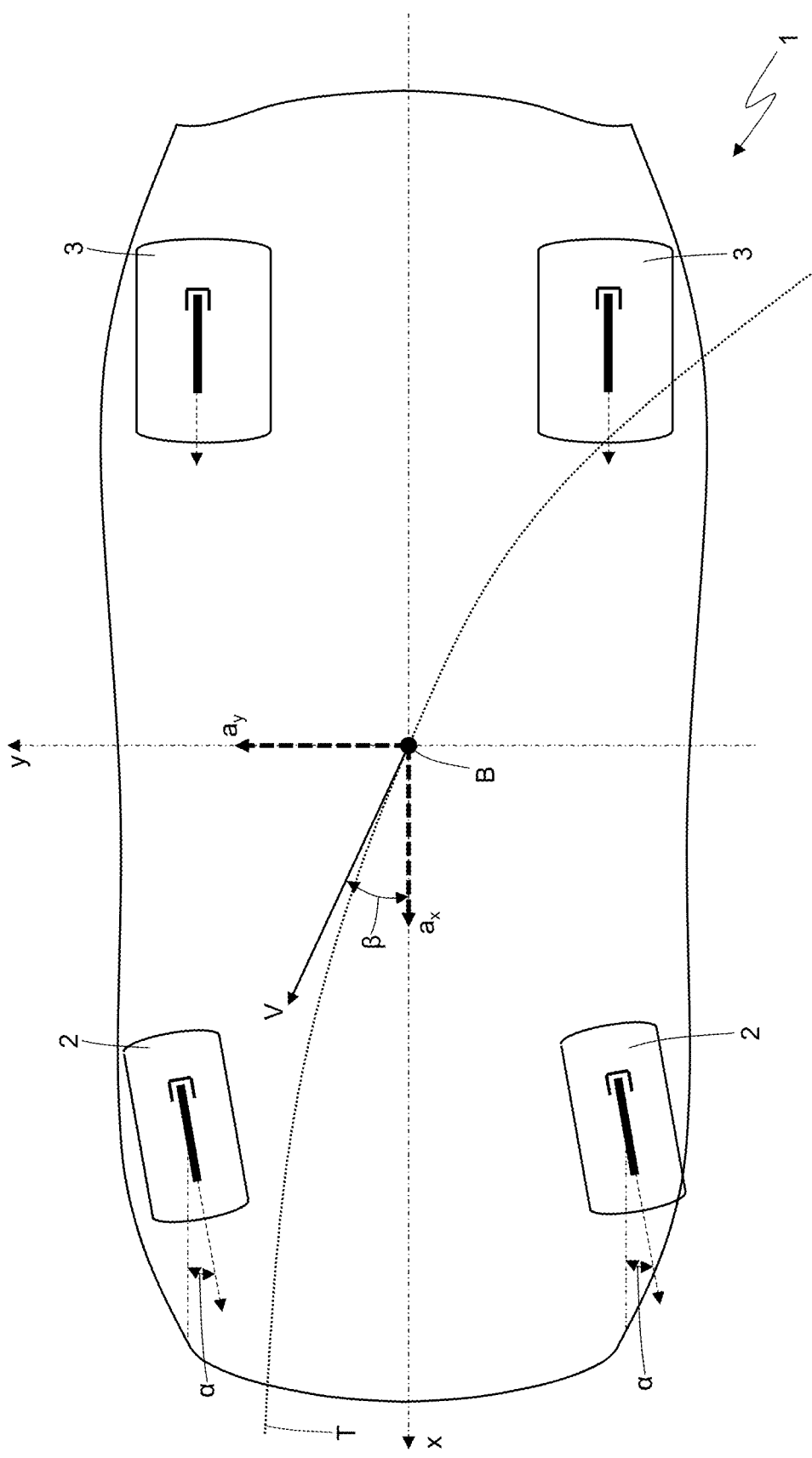
FIG. 3 is a schematic view of the road vehicle of FIG. 1 while driving along a bend, highlighting the trajectory, the driving speed, the steering angle and the attitude angle.

The control unit 12 is capable of cyclically reading the current value of a steering angle $\alpha$ (shown in FIG. 3) of the front wheels 2 (typically, through the BUS network of the road vehicle 1).

Figure 4:
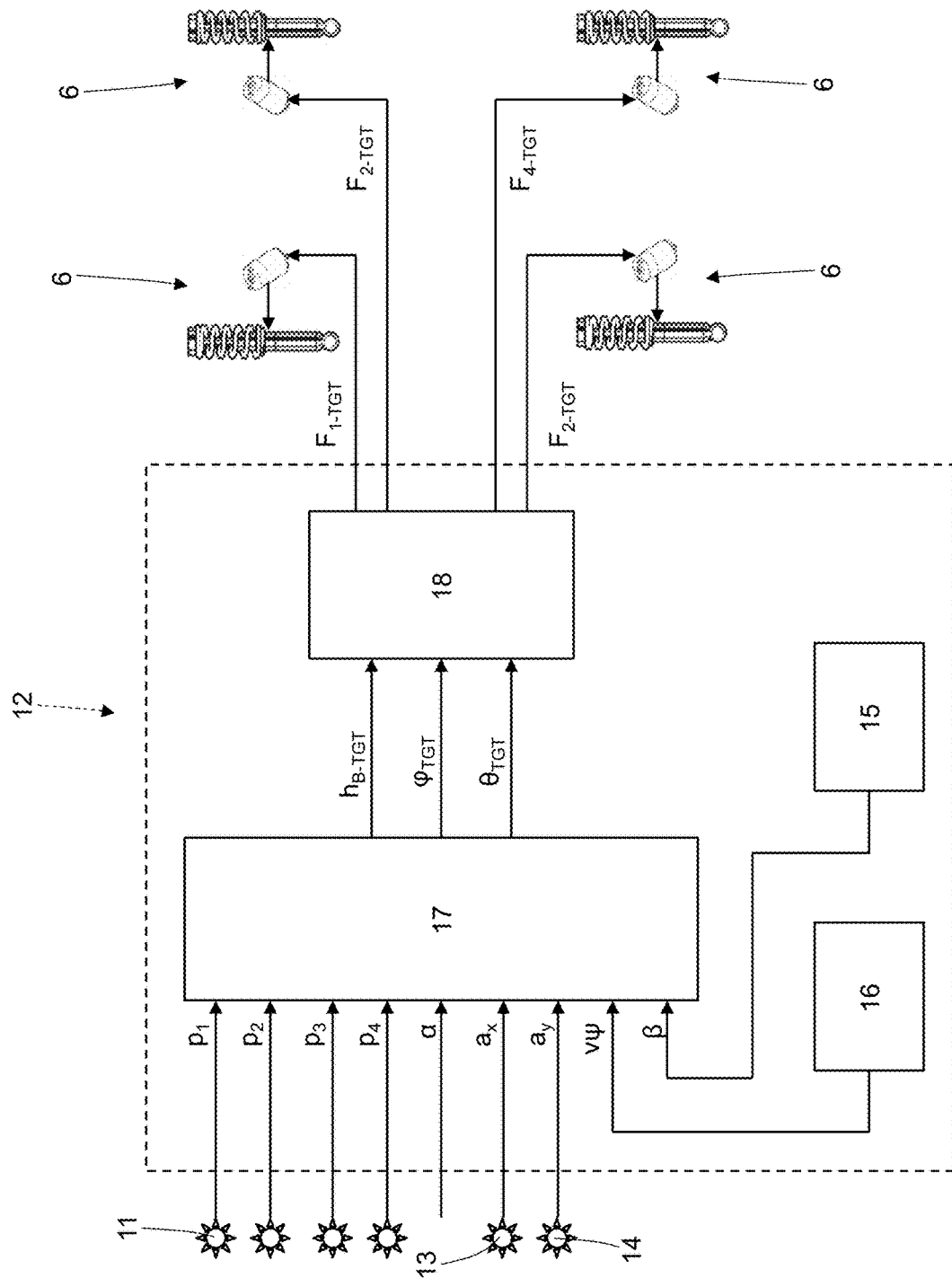
FIG. 4 is a control diagram implemented in a control unit of the road vehicle of FIG. 1.

According to FIG. 4, the control unit 12 implements an estimating block 15, which determines, in a known manner, the actual attitude angle $\beta$ of the road vehicle 1 (namely, the angle comprised between the longitudinal axis x of the road vehicle 1 and the direction of the driving speed V of the road vehicle 1 in the centre B of gravity). By way of example, the estimating block 15 of the control unit 12 estimates the trajectory T followed by the road vehicle 1 using the measures provided in real time by a triple-axis gyroscope and by a GPS tracking unit; in particular, the trajectory T is determined by integrating twice in time the accelerations measured by the triple-axis gyroscope and the measures provided by the GPS tracking unit are used to cyclically cancel the position errors occurring during the integration process. Furthermore, the estimates block 15 of the control unit 12 estimates the driving speed V of the road vehicle 1 in the centre B of gravity using the measures provided in real time by the triple-axis gyroscope; in particular, the speed V of the road vehicle 1 in the centre B of gravity is determined by integrating once in time the accelerations measured by the triple-axis gyroscope (making sure that the driving speed V of the road vehicle 1 in the centre of gravity B actually is tangent to the trajectory T followed by the road vehicle 1, otherwise, in case of a significant deviation, at least one further iteration of the calculation is carried out making corrections to the parameters used).

The control unit 12 implements an estimating block 16, which determines in a known manner a yaw angle $\psi$ (namely, the angle of oscillation of the road vehicle 1 around a vertical axis going through the centre B of gravity) and, as a consequence, a yaw speed $V\psi$, namely the variation of the yaw angle $\psi$ over time (the yaw speed $V\psi$ can be determined by deriving the yaw angle $\psi$ in time). According to a possible embodiment, the yaw speed $V\psi$ can be measured and provided by the same sensor integrating the two accelerometers 13 and 14; namely, the integrated sensor also provides, besides the longitudinal acceleration $a_x$ and the transverse acceleration $a_y$, the yaw speed $V\psi$; the yaw angle $\psi$ can be determined by integrating the yaw speed $V\psi$ in time.

According to FIG. 4, the control unit 12 implements a calculation block 17, which receives as an input: the positions $p_{1...4}$ of the four active shock absorbers 6 provided by the position sensors 11, the longitudinal acceleration $a_x$ provided by the longitudinal accelerometer 13, the transverse acceleration $a_y$ provided by the transverse accelerometer 14, the attitude angle $\beta$ provided by the estimating block 15 and the yaw speed $V\psi$ provided by the estimating block 16. The calculation block 17 determines, in ways that will be described more in detail below, a desired lowering $h_{b\text{-}TGT}$ of the centre B of gravity, namely a value (generally expressed in mm), which indicates the extent to which the centre B of gravity has to be lowered relative to a standard position assumed by the centre B of gravity in the absence of external interventions (for example, when the road vehicle 1 is still). Furthermore, the calculation block 17 determines, in ways that will be described more in detail below, a desired roll angle $\varphi_{TGT}$ and a desired pitch angle $\theta_{TGT}$.

The object of the desired lowering $h_{b\text{-}TGT}$ of the centre B of gravity is that of lowering the road vehicle 1 in dynamic conditions so as to obtain a better performance through a decrease in the transfer of absolute load, with a final effect of increase in the overall grip of the tyres of the wheels 2 (namely, each wheel 2 is basically stressed in the same way, instead of having more stressed wheels 2 and less stressed wheels 2); the decrease in the transfer of load takes place both in case of lateral slip and in case of longitudinal slip, with a consequent improvement of performances in terms of maximum transverse acceleration $a_y$ and maximum longitudinal acceleration $a_x$. Hence, the desired lowering $h_{b\text{-}TGT}$ of the centre B of gravity also positively affects the acceleration and braking phases, since the decrease in the transfer of longitudinal load allows a greater force to be transmitted to the ground and, consequently, leads to a greater maximum longitudinal acceleration $a_x$.

The object of the control of the desired roll angle $\varphi_{TGT}$ is that of reducing dynamic and static roll; it is possible to define both a gradient of static roll and a desired dynamic behaviour as the input frequencies change.

The objects of the control of the desired pitch angle $\theta_{TGT}$ are those of: reducing static and dynamic pitch, changing the attitude of the road vehicle 1 in order to optimize aerodynamic work points and damping transients in those braking actions in which the antilock braking system (ABS) of the wheels 2 intervenes. The reduction of the pitch and the slowing down of the dynamic of the pitch lead to a quicker settling of vertical and longitudinal forces and improve aerodynamic balance (thus reducing the transfer of longitudinal load); these different effects lead to an improvement of stopping spaces.

According to FIG. 4, the control unit 12 implements a calculation block 18, which receives as an input from the calculation block 17 the desired lowering $h_{b\text{-}TGT}$ of the centre B of gravity, the desired roll angle $\varphi_{TGT}$ and the desired pitch angle $\theta_{TGT}$ and determines, for each active shock absorber 6, a desired force $F_{1...4\text{-}TGT}$ (namely, a force target), which must be generated by the active shock absorber 6 and, hence, is expressed in Newton. Namely, the electric actuator 10 of each active shock absorber 6 is controlled so as to pursue the corresponding desired force $F_{1 \ldots 4\text{-}TGT}$, i.e. cause the corresponding desired force $F_{1 \ldots 4\text{-}TGT}$ to be generated.

According to a preferred embodiment, the calculation block 18 uses a mathematical model of the road vehicle 1, which, depending on the instant-by-instant value of the input variables (desired lowering $h_{b\text{-}TGT}$ of the centre B of gravity, desired roll angle $\varphi_{TGT}$ and desired pitch angle $\theta_{TGT}$) provides the instant-by-instant value of the output variables (desired forces $F_{1 \ldots 4\text{-}TGT}$ to be generated by the active shock absorbers 6).

Preferably, the control block 17 implemented in the control unit 12 recalculates (updates) the desired lowering $h_{b\text{-}TGT}$ of the centre B of gravity, the desired roll angle $\varphi_{TGT}$ and the desired pitch angle $\theta_{TGT}$ with a relatively low frequency generally ranging from 1 to 4 Hz; obviously, the control block 18 implemented in the control unit 12 recalculates (updates) the desired forces $F_{1 \ldots 4\text{-}TGT}$ with the same update frequency as the control block 17.

The control block 17 implemented in the control unit 12 establishes a desired lowering $h_{b\text{-}TGT}$ of the centre B of gravity of the road vehicle 1 depending on the longitudinal acceleration $a_x$ and on the transverse acceleration $a_y$ (as mentioned above, the actuator 10 of each shock absorber 6 is controlled so as to obtain the desired lowering $h_{b\text{-}TGT}$ of the centre B of gravity through the action of the control block 18). In particular, the control block 17 establishes a first contribution depending on the sole longitudinal acceleration $a_x$ (namely, without taking into account the transverse acceleration $a_y$), establishes a second contribution depending on the sole transverse acceleration $a_y$ (namely, without taking into account the longitudinal acceleration $a_x$) and then determines the desired lowering $h_{b\text{-}TGT}$ of the centre B of gravity as the greater one, in absolute value, between the first contribution and the second contribution (namely, it chooses the contribution with the higher absolute value). In other words, the desired lowering $h_{b\text{-}TGT}$ is equal to the contribution that has the greater absolute value.

According to FIG. 5, the control block 17 establishes the desired lowering $h_{b\text{-}TGT}$ of the centre B of gravity (namely, the first contribution of the desired lowering $h_{b\text{-}TGT}$ of the centre B of gravity) depending on the longitudinal acceleration $a_x$ by means of a linear law L1 (shown in FIG. 5). The linear law L1 is symmetrical, in a mirror-like manner, for positive and negative longitudinal accelerations $a_x$ (symmetrical in a mirror-like manner, as the desired lowering $h_{b\text{-}TGT}$ of the centre B of gravity always is negative regardless of the sign of the longitudinal acceleration $a_x$) and entails proportionally increasing the desired lowering $h_{b\text{-}TGT}$ of the centre B of gravity as the absolute value of the longitudinal acceleration $a_x$ increases. In particular, the linear law L1 entails a zero desired lowering $h_{b\text{-}TGT}$ of the centre B of gravity, when the absolute value of the longitudinal acceleration $a_x$ is smaller than a threshold value TH1, it entails a constant desired lowering $h_{b\text{-}TGT}$ of the centre B of gravity equal to a maximum value VMAX1, when the absolute value of the longitudinal acceleration $a_x$ is greater than a threshold value TH2, and it entails a linear variation of the desired lowering $h_{b\text{-}TGT}$ of the centre B of gravity from when the absolute value of the longitudinal acceleration $a_x$ is equal to the first threshold value TH1 to the maximum value VMAX1 when the absolute value of the longitudinal acceleration $a_x$ is equal to the second threshold value TH2.

In the embodiment shown in FIG. 5, the maximum value VMAX1 is equal (in absolute value) to 20 mm (in FIG. 5, the value VMAX1 is negative to indicate that it is a lowering), the threshold value TH1 is equal) in absolute value) to 0.25 g and the threshold value TH2 is equal (in absolute value) to 1 g; letter "g" indicates the average gravitational acceleration measured on earth, which conventionally amounts to 9.80665 m/s².

According to FIG. 6, the control block 17 establishes the desired lowering $h_{b\text{-}TGT}$ of the centre B of gravity (namely, the second contribution of the desired lowering $h_{b\text{-}TGT}$ of the centre B of gravity) depending on the transverse acceleration $a_y$ by means of a linear law L2. The linear law L2 is symmetrical, in a mirror-like manner, for positive and negative transverse accelerations $a_y$ (symmetrical in a mirror-like manner, as the desired lowering $h_{b\text{-}TGT}$ of the centre B of gravity always is negative regardless of the sign of the transverse acceleration $a_y$) and entails, in any operating condition, proportionally increasing the desired lowering $h_{b\text{-}TGT}$ of the centre B of gravity as the absolute value of the transverse acceleration $a_y$ increases; in particular, the linear law L2 entails a zero desired lowering $h_{b\text{-}TGT}$ of the centre B of gravity, only when the absolute value of the transverse acceleration $a_y$ is zero, and it entails a linear variation of the desired lowering $h_{b\text{-}TGT}$ of the centre B of gravity from a zero value, when the absolute value of the transverse acceleration $a_y$ is zero, to a maximum value VMAX2, when the absolute value of the transverse acceleration $a_y$ is maximum.

In the embodiment shown in FIG. 6, the value VMAX2 is equal (in absolute value) to 22.5 mm (in FIG. 6, the value VMAX2 is negative to indicate that it is a lowering) and is reached when the transverse acceleration $a_y$ is equal (in absolute value) to 1.5 g.

As mentioned above, the calculation block 18 uses a mathematical model of the road vehicle 1, which determines a target force $F_{1 \ldots 4\text{-}TGT}$ for the actuator 10 of each active shock absorber 6 (also) depending on the desired lowering $h_{b\text{-}TGT}$ of the centre B of gravity; as a consequence, the actuator 10 of each shock absorber is controlled so as to pursue the corresponding target force $F_{1 \ldots 4}$-TGT.

According to a preferred embodiment, the desired lowering $h_{b\text{-}TGT}$ of the centre B of gravity is established depending both on the longitudinal acceleration $a_x$ and on the transverse acceleration $a_y$; according to a different embodiment, the desired lowering $h_{b\text{-}TGT}$ of the centre B of gravity is established depending on the sole longitudinal acceleration $a_x$ or on the sole transverse acceleration $a_y$.

Figure 7:
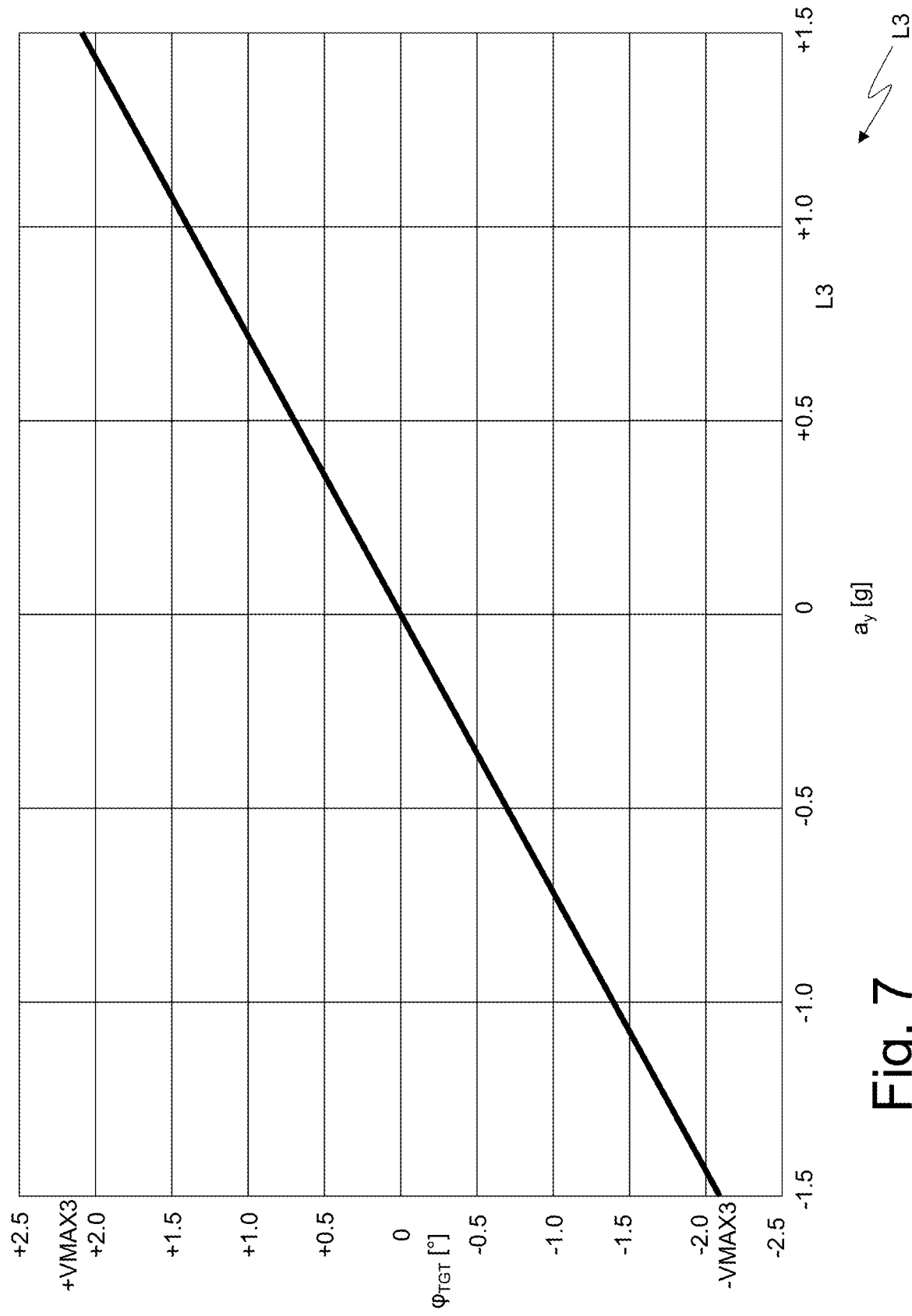
FIG. 7 is a diagram showing the variation of a desired roll angle of the road vehicle of FIG. 1 as transverse acceleration changes.

According to FIG. 7, the control block 17 establishes the desired roll angle $\varphi_{TGT}$ depending on the sole transverse acceleration $a_y$ by means of a linear law L3. The linear law L3 is symmetrical for positive and negative transverse accelerations $a_y$ (namely, the roll angle $\varphi_{TGT}$ always is positive, when the transverse acceleration $a_y$ is positive, and the roll angle $\varphi_{TGT}$ always is negative, when the transverse acceleration $a_y$ is negative) and entails linearly varying the desired roll angle $\varphi_{TGT}$ by a value ranging from 1.0° to 1.8° (and preferably equal to 1.4°) for each 1 g increase in the absolute value of the transverse acceleration $a_y$; namely, the linear law L3 entails a gradient (variation of the angle per unit of acceleration) ranging from 1.0°/g to 1.8°/g and preferably equal to 1.4°/g. As a consequence, the linear law L3 entails proportionally varying the absolute value of the desired roll angle $\varphi_{TGT}$ as the absolute value of the transverse acceleration $a_y$ increases and, in particular, the linear law L3 entails a zero desired roll angle $\varphi_{TGT}$ only when the absolute value of the transverse acceleration $a_y$ is zero; in other words, the linear law L3 entails a linear variation of the desired roll angle $\varphi_{TGT}$ from a zero value, when the absolute value of the transverse acceleration $a_y$ is zero, to a maximum absolute value VMAX3, when the absolute value of the transverse acceleration $a_y$ is maximum.

In the embodiment shown in FIG. 7, the value VMAX3 ranges, in absolute value, from 1.8° to 2.4° and preferably is equal to 2.1° and is reached when the transverse acceleration $a_y$ is equal (in absolute value) to 1.5 g.

Figure 8:
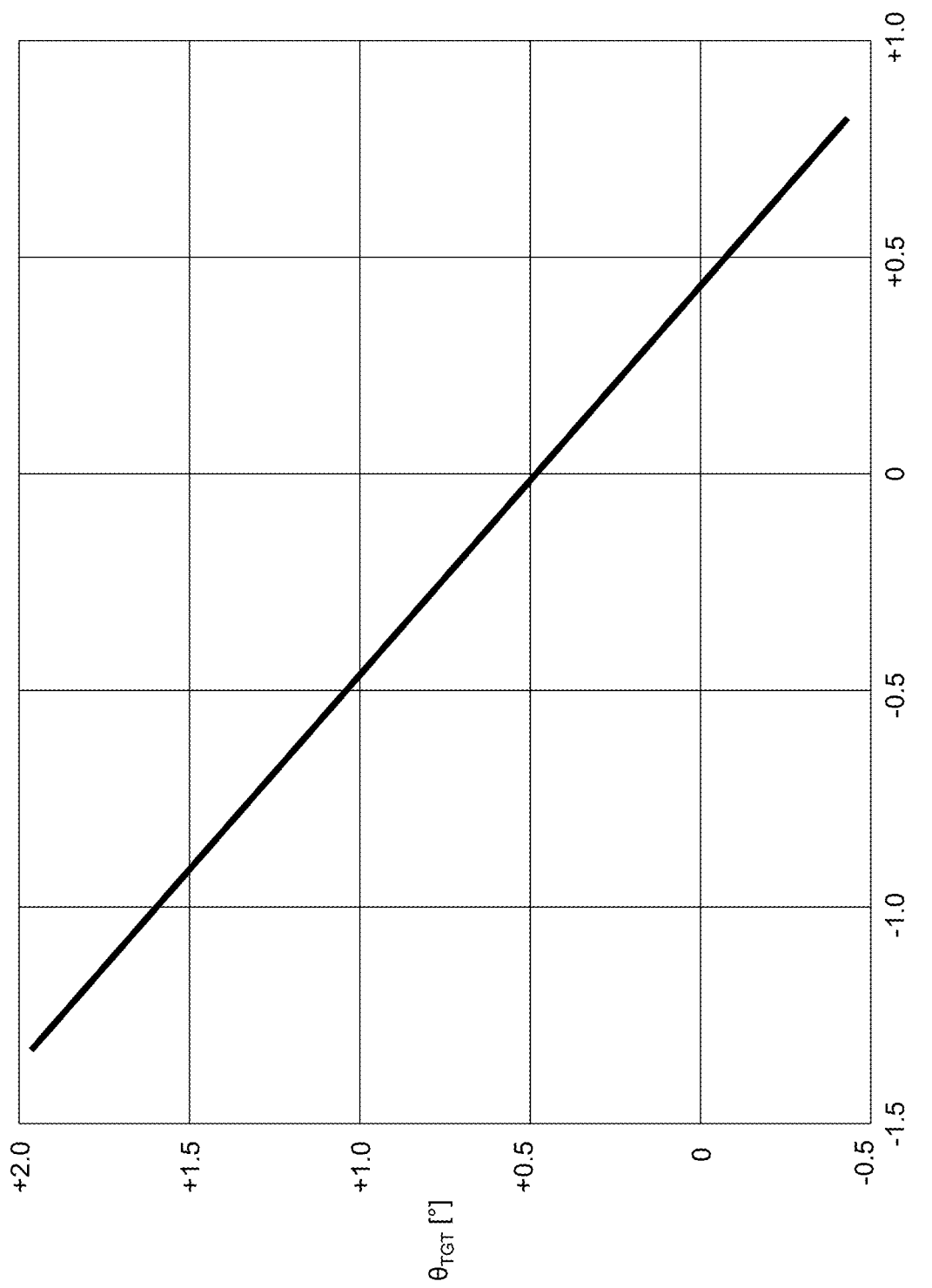
FIG. 8 is a diagram showing the variation of a desired pitch angle of the road vehicle of FIG. 1 as longitudinal acceleration changes.

According to FIG. 8, the control block 17 establishes the desired pitch angle $\theta_{TGT}$ depending on the sole longitudinal acceleration $a_x$ by means of a linear law L4. The linear law L4 is not symmetrical for positive or negative transverse accelerations $a_y$ (namely, the linear law L4 is unbalanced towards positive pitch angles $\theta_{TGT}$, which entail lowering the front part of the road vehicle 1 and lifting the rear part of the road vehicle 1) and entails varying the desired pitch angle $\theta_{TGT}$ by a value ranging from 1.2° to 2.0° (preferably equal to 1.6°) for each 1 g increase in the absolute value of the longitudinal acceleration $a_x$; namely, the linear law L4 entails a gradient (variation of the angle per unit of acceleration) ranging from 1.2°/g to 2.0°/g and preferably equal to 1.6°/g.

The linear law L4 entails proportionally increasing the desired pitch angle $\theta_{TGT}$ as the value of the longitudinal acceleration $a_x$ decreases. In particular, the linear law L4 entails a positive pitch angle $\theta_{TGT}$ greater than zero, when the value of the longitudinal acceleration $a_x$ is zero, and entails a negative pitch angle $\theta_{TGT}$, when the value of the longitudinal acceleration $a_x$ is positive (road vehicle 1 accelerating) and preferably greater than at least 0.3 g; in particular, the linear law L4 entails a zero pitch angle $\theta_{TGT}$ when the value of the longitudinal acceleration $a_x$ is positive (namely, the road vehicle 1 is accelerating) and ranges from 0.3 g to 0.5 g (preferably is equal to 0.4 g).

In the embodiment shown in FIG. 8, the linear law L4 entails that the desired pitch angle $\theta_{TGT}$ ranges from +2.0° to −0.5° in case of maximum deceleration and maximum acceleration, respectively.

The zero roll angle $\varphi_{TGT}$ (namely, equal to 0°) and the zero pitch angle (namely, equal to 0°) correspond to the neutral condition of the road vehicle 1, which occurs when the road vehicle 1 is still (parked) on a flat surface, namely is in perfectly static conditions.

As mentioned above, the calculation block 18 uses a mathematical model of the road vehicle 1, which determines a target force $F_{1\ldots4\text{-}TGT}$ for the actuator 10 of each active shock absorber 6 (also) depending on the desired roll angle $\varphi_{TGT}$ and on the desired pitch angle $\theta_{TGT}$; as a consequence, the actuator 10 of each shock absorber is controlled so as to pursue the corresponding target force $F_{1\ldots4\text{-}TGT}$.

According to a preferred embodiment, the calculation block 18 (which establishes a desired roll angle $\varphi_{TGT}$ and determines a target force $F_{1\ldots4\text{-}TGT}$ for the actuator 10 of each active shock absorber 6 depending on the desired roll angle $\varphi_{TGT}$) determines a total anti-roll moment depending on the desired roll angle $\theta_{TGT}$ (namely, a total anti-roll moment which allows the desired roll angle $\theta_{TGT}$ to be obtained), establishes a distribution of the total anti-roll moment between a front axle (comprising the two front wheels 2) and a rear axle (comprising the two rear wheels 2) and determines the target force $F_{1\ldots4\text{-}TGT}$ for the actuator 10 of each active shock absorber 6 depending on the total anti-roll moment and also depending on the distribution of the total anti-roll moment between the front axle and the rear axle.

The total anti-roll moment is traditionally distributed in a symmetrical manner between the front axle and the rear axle, namely an anti-roll moment generated for the front axle always is equal to an anti-roll moment generated for the rear axle. It has been observed that an asymmetrical distribution of the total anti-roll moment is advantageous, namely the anti-roll moment generated for the front axle is different from the anti-roll moment generated for the rear axle; furthermore, the distribution of the total anti-roll moment can be changed (by moving part of the total anti-roll moment from the front axle to the rear axle or vice versa) depending on the moving state of the road vehicle 1.

According to a preferred embodiment, the distribution of the total anti-roll moment entails a lower limit value, which determines an increase in the anti-roll moment of the rear axle and ranges from −12% to −6% (namely, the anti-roll moment of the rear axle is greater than the anti-roll moment of the front axle by 12%-6%), and an upper limit value, which determines an increase in the anti-roll moment of the front axle and ranges from +1.5% to +4% (namely, the anti-roll moment of the front axle is greater than the anti-roll moment of the rear axle by 1.5%-4%).

The calculation block 18 determines when the road vehicle 1 is about to start a bend or is in the middle of a bend and establishes a distribution of the total anti-roll moment more unbalanced towards the rear axle, when the road vehicle 1 is about to start a bend or is in the middle of a bend. Furthermore, the calculation block 18 determines when the road vehicle 1 is exiting a bend and establishes a distribution of the total anti-roll moment less unbalanced towards the front axle, when the road vehicle 1 is exiting a bend.

The calculation block 18 determines whether the road vehicle 1 has an oversteering behaviour and unbalances the distribution of the total anti-roll moment towards the front axle, when the road vehicle 1 has an oversteering behaviour (so as to counter the oversteering behaviour in order to try and give the road vehicle 1 more neutral behaviour). Similarly, the calculation block 18 determines whether the road vehicle 1 has an understeering behaviour and unbalances the distribution of the total anti-roll moment towards the rear axle, when the road vehicle 1 has an understeering behaviour (so as to counter the understeering behaviour in order to try and give the road vehicle 1 more neutral behaviour).

The total anti-roll moment introduced by the roll control can arbitrarily be distributed between the front axle and the rear axle; the choice of this distribution affects the distribution of the transfer of lateral load between the two axles, keeping the total transfer unchanged. In general, a distribution more unbalanced towards the rear axle increases the maximum lateral acceleration, for it delays the saturation of the front axle; therefore, this configuration is to be preferred when the vehicle is about to start or is in the middle of a bend with pure lateral slip. A distribution shifted to the front axle, on the other hand, decreases the maximum lateral acceleration, advancing the saturation of the front axle, but, at the same time, it privileges the rear axle, making it capable of transferring more longitudinal force; therefore, this configuration is to be preferred during the traction phase exiting a curve. The distribution of the anti-roll moment can dynamically be changed in order to put the road vehicle 1 in a better condition in the different phases of the bend; by way of example, the distribution of the anti-roll moment could entail a value of −8.5% (when the vehicle is about to start or is in the middle of the bend) and −3% (exiting the bend), thus using a variation of approximately 5%.

The combination of control of the height of the centre B of gravity and control of the roll angle $\varphi$ allows the angle on the inside of the bend to be maintained still and the position of the angle on the outside of the bend to be left unchanged; an ideal behaviour is obtained by imposing a desired roll angle $\varphi_{TGT}$ corresponding to half the roll angle $\varphi$ of the non-controlled road vehicle 1 (namely, with the active shock absorbers 6 turned off and, hence, only in passive mode) and by imposing a desired lowering $h_{b\text{-}TGT}$ of the centre B of gravity equal to half the lowering of the angle on the outside of the bend of the non-controlled road vehicle 1 (namely, with the active shock absorbers 6 turned off and, hence, only in passive mode). This functionality depends on the transverse acceleration $a_y$, specifically, when driving along a bend, a downward force is activated in the angles on the inside of the bend in order to avoid the extension thereof so as to lower the centre B of gravity ad reduce the roll; in order to further reduce the roll gradient, an action upon the outer angle is also needed through an upward force (which, anyway, is much smaller than the force required for the inner angle).

The combination of the controls of the height of the centre B of gravity and of the static pitch angle θ leads to a lowering of the centre B of gravity through differentiation of the heights from the ground between front and rear axle, so as to work in the best point of aerodynamic efficiency. This functionality is important both for absolute performances, in fact the vertical load can be increased with a proper positioning according to a predetermined aerodynamic map, and for consumptions, since the resistance to the forward movement of the vehicle can be reduced when driving along a straight road. For example, the control could not entail any height unbalance between the two axles for speeds below 100 km/h, an increase in the vertical load for speeds exceeding 100 km/h through a greater lowering of the front axle compared to the rear axle and a lowering of the front axle also along a straight road in order to decrease the resistance to the forward movement.

The combination of the controls of the height of the centre B of gravity and of the pitch angle θ also optimizes stopping spaces. Thanks to the lowering of the centre of gravity, there is a smaller transfer of longitudinal load with a consequent increase in the overall grip; on the other hand, thanks to the control of both the static and the dynamic pitch angle θ, there is a quicker settling of vertical and longitudinal forces.

The embodiments described herein can be combined with one another, without for this reason going beyond the scope of protection of the invention.

The control method described above has different advantages.

First of all, the control method described above increases the performances of the road vehicle 1 when driving close to the grip limit (typically on a track) both along bends and along straight roads (during the acceleration when exiting a bend or during the deceleration when entering a bend).

In particular, the control method described above reduces both static and dynamic roll as well as both static and dynamic pitch and these reductions can directly be perceived by the driver, who, then, gets the impression of a road vehicle 1 that is more stable and, hence, more fun (safer) to be driven. Furthermore, the lowering of the centre B of gravity determines an increase in performances, for it reduces the transfer of absolute load, and, hence, allows all wheels 2 to work at their limit. The reduction in static and dynamic pitch improves braking performances. The dynamic distribution of the anti-roll moment improves braking performances, since it leads to an ideal management of the friction ellipse of the tyres of the wheels 2.

Namely, the control method described above improves pure performances, reducing lap times, and also improves the driving fun, giving drivers the feeling of a more usable car.

Furthermore, the control method described above is particularly sturdy and safe in all conditions, namely it has a basically zero risk of control errors that can generate anomalous oscillations or over-elongations of the suspensions 5.

Finally, the control method described above is simple and economic to be implemented, for it does not require either a significant calculation ability or a large memory space.

LIST OF THE REFERENCE NUMBERS OF THE FIGURES 1 vehicle
2 wheels
3 hub
4 frame
5 suspension
6 active shock absorber
7 element
8 element
9 spring
10 electric actuator
11 position sensor
12 control unit
13 longitudinal accelerometer
14 transverse accelerometer
15 estimating block
16 estimating block
17 control block
18 control block
ax longitudinal acceleration
ay transverse acceleration
B centre of gravity
α steering angle
β attitude angle
$h_{B\text{-}TGT}$ desired lowering of the centre of gravity
F force
$F_{TGT}$ desired force
φ roll angle
θ pitch angle
ψ yaw angle
α steering angle
Vψ yaw speed
L1 law
L2 law
L3 law
L4 law

The invention claimed is:

1. A method to control active shock absorbers (6) of a road vehicle (1); each active shock absorber (6) is part of a suspension (5) connecting a frame (4) to a hub (3) of a wheel (2) and is provided with an actuator (10); the control method comprises the steps of:
  determining a longitudinal acceleration (ax) and a transverse acceleration (ay) of the road vehicle (1);
  establishing a desired roll angle ($\varphi_{TGT}$) based on the transverse acceleration (ay);
  establishing a desired pitch angle ($\theta_{TGT}$) based on the longitudinal acceleration (ax); and
  controlling the actuator (10) of each active shock absorber (6) so as to obtain the desired roll angle ($\varphi_{TGT}$) and the desired pitch angle ($\theta_{TGT}$);
  wherein the desired roll angle ($\varphi_{TGT}$) is established depending on the sole transverse acceleration (ay) by means of a first linear law (L3); and
  wherein the desired pitch angle ($\theta_{TGT}$) is established depending on the sole longitudinal acceleration (ax) by means of a second linear law (L4), wherein the first linear law (L3) entails varying the desired roll angle ($\varphi_{TGT}$), in absolute value, by a value ranging from 1.0° to 1.8° with each 1 g increase of the absolute value of the transverse acceleration (ay).

2. The control method according to claim 1, wherein the first linear law (L3) entails proportionally varying the absolute value of the desired roll angle ($\varphi_{TGT}$) as the absolute value of the transverse acceleration (ay) increases.

3. The control method according to claim 1, wherein the first linear law (L3) entails a zero desired roll angle ($\varphi_{TGT}$) only when the absolute value of the transverse acceleration (ay) is zero.

4. The control method according to claim 1, wherein the first linear law (L3) entails a linear variation of the absolute value of the desired roll angle ($\varphi_{TGT}$) from a zero value when the absolute value of the transverse acceleration (ay) is zero to a maximum value (VMAX3) when the absolute value of the transverse acceleration (ay) is maximum.

5. The control method according to claim 1, wherein the second linear law (L4) entails increasing the desired pitch angle ($\theta_{TGT}$) by a value ranging from 1.2° to 2.0° with each 1 g increase of the absolute value of the longitudinal acceleration (ax).

6. The control method according to claim 1, wherein the second linear law (L4) entails proportionally increasing the desired pitch angle ($\theta_{TGT}$) as the value of the longitudinal acceleration (ax) decreases.

7. The control method according to claim 1, wherein the second linear law (L4) entails a positive pitch angle ($\theta_{TGT}$) greater than zero when the value of the longitudinal acceleration (ax) is zero and it entails a negative pitch angle ($\theta_{TGT}$) when the value of the longitudinal acceleration (ax) is positive.

8. The control method according to claim 7, wherein the second linear law (L4) entails a zero pitch angle ($\theta_{TGT}$) when the value of the longitudinal acceleration (ax) is positive and greater than 0.3 g.

9. The control method according to claim 1 and comprising the further steps of:
establishing a desired lowering ($h_{b\text{-}TGT}$) of a centre (B) of gravity of the road vehicle (1) depending on the longitudinal acceleration (ax) and on the transverse acceleration (ay); and
controlling the actuator (10) of each active shock absorber (6) so as to also obtain the desired lowering ($h_{b\text{-}TGT}$) of the centre (B) of gravity.

10. The control method according to claim 9 and comprising the further steps of:
establishing a first contribution depending on the sole longitudinal acceleration (ax);
establishing a second contribution depending on the sole transverse acceleration (ay); and
establishing that the desired lowering ($h_{b\text{-}TGT}$) is equal to the contribution having the greater absolute value.

11. The control method according to claim 10, wherein:
the first contribution is established depending on the sole longitudinal acceleration (ax) by means of a third linear law (L1); and
the second contribution is established depending on the sole transverse acceleration (ay) by means of a fourth linear law (L2).

12. The control method according to claim 9 and comprising the further steps of:
using a mathematical model of the road vehicle (1) to determine a target force ($F_{1\ldots 4\text{-}TGT}$) for the actuator (10) of each active shock absorber (6) only and exclusively depending on the desired roll angle ($\varphi_{TGT}$), on the desired pitch angle ($\theta_{TGT}$) and on the desired lowering ($h_{b\text{-}TGT}$) of the centre (B) of gravity; and
controlling the actuator (10) of each shock absorber so as to pursue the corresponding target force ($F_{1\ldots 4\text{-}TGT}$).

13. The control method according to claim 1 and comprising the further steps of:
determining a total anti-roll moment depending on the desired roll angle ($\varphi_{TGT}$);
establishing a distribution of the total anti-roll moment between a front axle and a rear axle;
determining a target force ($F_{1\ldots 4\text{-}TGT}$) for the actuator (10) of each active shock absorber (6) depending on the total anti-roll moment and also depending on the distribution of the total anti-roll moment between the front axle and the rear axle; and
controlling the actuator (10) of each shock absorber so as to pursue the corresponding target force ($F_{1\ldots 4\text{-}TGT}$).

14. The control method according to claim 13, wherein the distribution of the total anti-roll moment between the front axle and the rear axle can be asymmetrical, namely an anti-roll moment to the front axle can be different from the anti-roll moment to the rear axle.

15. The control method according to claim 14 and comprising the further steps of:
determining when the road vehicle (1) is about to start a bend, is in the middle of a bend or is exiting a bend;
establishing the unbalance of the distribution of the total anti-roll moment towards the rear axle when the road vehicle (1) is about to start a bend or is in the middle of a bend; and
decreasing the unbalance of the distribution of the total anti-roll moment towards the rear axle when the road vehicle (1) is exiting a bend.

16. The control method according to claim 14 and comprising the further steps of:
determining whether the road vehicle (1) has an oversteering behaviour;
unbalancing the distribution of the total anti-roll moment towards the front axle when the road vehicle (1) has an oversteering behaviour;
determining whether the road vehicle (1) has an understeering behaviour; and
unbalancing the distribution of the total anti-roll moment towards the rear axle when the road vehicle (1) has an understeering behaviour.

17. The control method according to claim 1, wherein the first linear law (L3) entails varying the desired roll angle ($\varphi_{TGT}$), in absolute value, by a value equal to 1.4° with each 1 g increase of the absolute value of the transverse acceleration (ay).

18. The control method according to claim 1, wherein the second linear law (L4) entails increasing the desired pitch angle ($\theta_{TGT}$) by a value equal to 1.6° with each 1 g increase of the absolute value of the longitudinal acceleration (ax).

19. The control method according to claim 1, wherein the second linear law (L4) entails a positive pitch angle ($\theta_{TGT}$) greater than zero when the value of the longitudinal acceleration (ax) is zero and it entails a negative pitch angle ($\theta_{TGT}$) when the value of the longitudinal acceleration (ax) is positive and greater than 0.3 g.

20. The control method according to claim 19, wherein the second linear law (L4) entails a zero pitch angle ($\theta_{TGT}$) when the value of the longitudinal acceleration (ax) is positive and is greater than 0.3 g.

21. The control method according to claim 19, wherein the second linear law (L4) entails a zero pitch angle ($\theta_{TGT}$) when the value of the longitudinal acceleration (ax) is positive and is greater than 0.5 g.

22. A method to control active shock absorbers (6) of a road vehicle (1); each active shock absorber (6) is part of a suspension (5) connecting a frame (4) to a hub (3) of a wheel (2) and is provided with an actuator (10); the control method comprises the steps of:

determining a longitudinal acceleration (ax) and a transverse acceleration (ay) of the road vehicle (1);

establishing a desired roll angle ($\varphi_{TGT}$) based on the transverse acceleration (ay);

establishing a desired pitch angle ($\theta_{TGT}$) based on the longitudinal acceleration (ax); and controlling the actuator (10) of each active shock absorber (6) so as to obtain the desired roll angle ($\varphi_{TGT}$) and the desired pitch angle ($\theta_{TGT}$);

wherein the desired roll angle ($\varphi_{TGT}$) is established depending on the sole transverse acceleration (ay) by means of a first linear law (L3);

wherein the desired pitch angle ($\theta_{TGT}$) is established depending on the sole longitudinal acceleration (ax) by means of a second linear law (L4);

wherein the second linear law (L4) entails increasing the desired pitch angle ($\theta_{TGT}$) by a value ranging from 1.2° to 2.0° with each 1 g increase of the absolute value of the longitudinal acceleration (ax).

23. The control method according to claim 22, wherein the second linear law (L4) entails increasing the desired pitch angle ($\theta_{TGT}$) by a value equal to 1.6° with each 1 g increase of the absolute value of the longitudinal acceleration (ax).

24. The control method according to claim 22, wherein the second linear law (L4) entails a positive pitch angle ($\theta_{TGT}$) greater than zero when the value of the longitudinal acceleration (ax) is zero and it entails a negative pitch angle ($\theta_{TGT}$) when the value of the longitudinal acceleration (ax) is positive and greater than 0.3 g.

25. The control method according to claim 24, wherein the second linear law (L4) entails a zero pitch angle ($\theta_{TGT}$) when the value of the longitudinal acceleration (ax) is positive and is greater than 0.3 g.

26. The control method according to claim 24, wherein the second linear law (L4) entails a zero pitch angle ($\theta_{TGT}$) when the value of the longitudinal acceleration (ax) is positive and is greater than 0.5 g.

27. A method to control active shock absorbers (6) of a road vehicle (1); each active shock absorber (6) is part of a suspension (5) connecting a frame (4) to a hub (3) of a wheel (2) and is provided with an actuator (10); the control method comprises the steps of:

determining a longitudinal acceleration (ax) and a transverse acceleration (ay) of the road vehicle (1);

establishing a desired roll angle ($\varphi_{TGT}$) based on the transverse acceleration (ay);

establishing a desired pitch angle ($\theta_{TGT}$) based on the longitudinal acceleration (ax); and controlling the actuator (10) of each active shock absorber (6) so as to obtain the desired roll angle ($\varphi_{TGT}$) and the desired pitch angle ($\theta_{TGT}$);

wherein the desired roll angle ($\varphi_{TGT}$) is established depending on the sole transverse acceleration (ay) by means of a first linear law (L3);

wherein the desired pitch angle ($\theta_{TGT}$) is established depending on the sole longitudinal acceleration (ax) by means of a second linear law (L4);

wherein the second linear law (L4) entails a positive pitch angle ($\theta_{TGT}$) greater than zero when the value of the longitudinal acceleration (ax) is zero and it entails a negative pitch angle ($\theta_{TGT}$) when the value of the longitudinal acceleration (ax) is positive and greater than 0.3 g.

28. The control method according to claim 27, wherein the second linear law (L4) entails a zero pitch angle ($\theta_{TGT}$) when the value of the longitudinal acceleration (ax) is positive and is greater than 0.3 g.

29. The control method according to claim 27, wherein the second linear law (L4) entails a zero pitch angle ($\theta_{TGT}$) when the value of the longitudinal acceleration (ax) is positive and is greater than 0.5 g.

\* \* \* \* \*